(12) United States Patent
Tremblay et al.

(10) Patent No.: US 8,333,873 B2
(45) Date of Patent: *Dec. 18, 2012

(54) APPARATUS FOR ELECTROLYZING AN ELECTROLYTIC SOLUTION

(75) Inventors: Mario Elmen Tremblay, West Chester, OH (US); Daniel F. Nesbitt, Cincinnati, OH (US); Dimitris Ioannis Collias, Mason, OH (US); Michael Donovan Mitchell, Cincinnati, OH (US); Craig Merillat Rasmussen, Loveland, OH (US)

(73) Assignee: Pur Water Purification Products, Inc., Cincinnati, OH (US)

( * ) Notice: Subject to any disclaimer, the term of this patent is extended or adjusted under 35 U.S.C. 154(b) by 53 days.

This patent is subject to a terminal disclaimer.

(21) Appl. No.: 11/903,613

(22) Filed: Sep. 24, 2007

(65) Prior Publication Data

US 2008/0041717 A1  Feb. 21, 2008

Related U.S. Application Data

(63) Continuation of application No. 10/027,667, filed on Dec. 21, 2001, now abandoned.

(60) Provisional application No. 60/300,211, filed on Jun. 22, 2001.

(51) Int. Cl.
*C25B 9/06* (2006.01)

(52) U.S. Cl. .................. 204/278.5; 204/275.1; 204/271

(58) Field of Classification Search ................ 204/278.5
See application file for complete search history.

(56) References Cited

U.S. PATENT DOCUMENTS

| | | | |
|---|---|---|---|
| 3,616,355 A | 10/1971 | Themy | |
| 3,632,498 A | 1/1972 | Beer | |
| 4,048,047 A | 9/1977 | Beck et al. | |
| 4,062,754 A | 12/1977 | Eibl | |
| 4,100,052 A | 7/1978 | Stillman | |
| 4,119,517 A | 10/1978 | Hengst | |
| 4,328,084 A | 5/1982 | Shindell | |
| 4,414,070 A | 11/1983 | Spence | |
| 4,761,208 A | 8/1988 | Gram et al. | |
| 4,917,782 A | 4/1990 | Davies | |
| 5,256,268 A * | 10/1993 | Goto et al. | 204/268 |
| 5,294,307 A | 3/1994 | Jackson | |
| 5,308,507 A * | 5/1994 | Robson | 210/748.19 |
| 5,314,589 A | 5/1994 | Hawley | |
| 5,395,492 A | 3/1995 | Schoeberl | |

(Continued)

FOREIGN PATENT DOCUMENTS

DE  3121337 A1  12/1982

(Continued)

OTHER PUBLICATIONS

US 3,707,728, 10/1972, Appleman (withdrawn).

(Continued)

*Primary Examiner* — Harry D Wilkins, III
(74) *Attorney, Agent, or Firm* — Dinsmore & Shohl, LLP

(57) ABSTRACT

A method for killing microorganisms in water, by passing an aqueous feed solution comprising of water containing some form of halide salt into a non-membrane electrolysis cell comprising an anode and a cathode, adjacent to the anode, while flowing electrical current between the anode and the cathode to electrolyze the aqueous feed solution and convert the halide salt to anti-microbial mixed oxidants.

30 Claims, 9 Drawing Sheets

U.S. PATENT DOCUMENTS

| | | | |
|---|---|---|---|
| 5,439,576 A | 8/1995 | Schoeberl | |
| 5,534,120 A | 7/1996 | Ando et al. | |
| 5,547,581 A * | 8/1996 | Andelman | 210/656 |
| 5,556,523 A * | 9/1996 | Satoh et al. | 204/272 |
| 5,753,098 A | 5/1998 | Bess, Jr. et al. | |
| 5,795,459 A * | 8/1998 | Sweeney | 205/701 |
| 5,865,966 A | 2/1999 | Watanabe et al. | |
| 5,937,641 A | 8/1999 | Graham et al. | |
| 5,954,939 A | 9/1999 | Kanekuni et al. | |
| 6,261,464 B1 | 7/2001 | Herrington et al. | |
| 6,306,281 B1 | 10/2001 | Kelley | |
| 6,787,009 B2 * | 9/2004 | Merk et al. | 204/268 |
| 7,048,842 B2 * | 5/2006 | Tremblay et al. | 205/499 |
| 2002/0157966 A1 | 10/2002 | Weakly et al. | |
| 2003/0006144 A1 * | 1/2003 | Tremblay et al. | 205/618 |
| 2003/0042134 A1 | 3/2003 | Tremblay et al. | |

FOREIGN PATENT DOCUMENTS

| | | |
|---|---|---|
| DE | 3341797 A1 | 5/1985 |
| EP | 0 293 151 B1 | 11/1988 |
| EP | 0 353 367 B1 | 6/1993 |
| WO | WO 97/40212 A1 | 10/1997 |
| WO | WO 00/34184 A1 | 6/2000 |

OTHER PUBLICATIONS

Derwent Publication, XP-002205704, Nagy et al., Aug. 1985.
Derwent Publication, XP-002205705, Pleshakov et al., Mar. 1981.

* cited by examiner

APPARATUS FOR ELECTROLYZING AN ELECTROLYTIC SOLUTION

CROSS REFERENCE TO RELATED APPLICATION

This application is a continuation of U.S. application Ser. No. 10/027,667, filed Dec. 21, 2001, now abandoned, which claims the benefit of U.S. Provisional Application No. 60/300,211, filed Jun. 22, 2001.

FIELD OF THE INVENTION

This invention relates to devices and methods for generating mixed oxidants, such as hypochlorite and chlorine, from aqueous solutions containing naturally present salts (e.g. naturally present NaCl) or added salts (e.g. added NaCl). Our approach employs a voltage potential across a pair of electrodes to induce current flow through the water, to electrolyze the water that passes between the electrodes, thereby sterilizing the water. As contaminated water passes between the electrodes, the microorganisms are killed and the water is sterilized. Additionally, the treated water also retains some residual biocidal benefit, due to the reactions involving residual chloride ions within the water that generate biocidal agents such as free chlorine ($Cl_2$), hypochlorous acid ions ($OCl^-$), and other biocidal ions and free radicals. Two of the key parameters that have led to the improvements in efficiency of the electrolysis of the chloride ions, to enable effective kill of microorganisms in water, are the elimination of the membrane separating the anode and cathode and the close proximity of the two electrodes (e.g. <0.5 mm). As a result, we have developed several small, efficient, portable, battery-powered devices that can effectively kill microorganisms in contaminated solutions.

BACKGROUND OF THE INVENTION

Various oxidants, such as hypochlorite, chlorine, chlorine dioxide and other chlorine based oxidants, are some of the most effective antimicrobial agents for use in industrial and domestic process and services, and for commercial and consumer products. The strong oxidative potential of these oxidant molecules make it ideal for a wide variety of uses that include disinfecting and sterilizing. Concentrations of oxidant species in an aqueous solution as low as 1 part per million (ppm) or less, are known to kill a wide variety of microorganisms, including bacteria, viruses, molds, fungi, and spores. Higher concentrations of oxidants, up to several hundred ppms, provide even higher disinfection and oxidation of numerous compounds for a variety of applications, including the wastewater treatment, industrial water treatment (e.g. cooling water), fruit-vegetable disinfection, oil industry treatment of sulfites, textile industry, and medical waste treatment. Oxidants can react with and break down phenolic compounds, and thereby removing phenolic-based tastes and odors from water. Oxidants are also used in treating drinking water and wastewater to eliminate cyanides, sulfides, aldehydes and mercaptans.

While separate-compartment, membrane-containing electrolysis cells have been used to make hypochlorite and other oxidants on a commercial scale, they have not been completely satisfactory at the consumer level (i.e. small and portable). Even though there have been some electrochemical units that we developed for consumer applications using the electrochemical approach, these have proven to be more expensive to produce and have required larger amounts of power to achieve the desired efficacy. The electrolysis cells in commercial use, and disclosed in the prior art that utilize ion permeable membranes or diaphragms, require that the anolyte solution be substantially free of divalent cations, such as magnesium and calcium, to avoid the formation of precipitated calcium or magnesium salts that would quickly block and cover the membrane, and significantly reduce or stop the electrolysis reaction.

Consequently, there remains a need for a simple, safe method and apparatus for manufacturing these antimicrobial oxidants for domestic uses, under a wide variety of situations. The present invention describes a method and an apparatus for making antimicrobial oxidants inexpensively, easily and effectively.

SUMMARY OF THE INVENTION

The present invention relates to a method for making antimicrobial oxidants from an aqueous solution comprising of naturally present salts (e.g. water naturally containing NaCl), or added salts (e.g. water to which NaCl was added) using a non-membrane electrolysis cell. A non-membrane electrolysis cell is an electrolysis cell that comprises an anode electrode and a cathode electrode, and having a cell chamber, and which does not have an ion permeable membrane that divides the cell passage into two (or more) distinct anode and cathode chambers. The various salts are converted to antimicrobial oxidants as electricity passes through the aqueous feed solution in a passage that forms a portion of the cell chamber adjacent to the surface of the anode.

The present invention provides a method for making antimicrobial oxidants, comprising the steps of: (1) providing an aqueous feed solution comprising of natural water or water to which a chloride salt is already present or to which chloride salt has been added; (2) passing the aqueous feed solution into a cell chamber of a non-membrane electrolysis cell comprising an anode and a cathode, and along a passage adjacent to the anode; (3) flowing an electrical current between the anode and the cathode, thereby electrolyzing the aqueous feed solution in the passage, whereby a portion of the salt in the passage is converted to antimicrobial oxidants; and (4) passing the electrolyzed aqueous solution out of the electrolysis cell, thereby forming an aqueous effluent comprising antimicrobial oxidants not needed based on the approach we chose as listed in claims 1.

BRIEF DESCRIPTION OF THE DRAWINGS

The various advantages of the present invention will become apparent to skilled artisans after studying the following specification and by reference to the drawings in which.

DETAILED DESCRIPTION OF THE INVENTION

Figure 1:
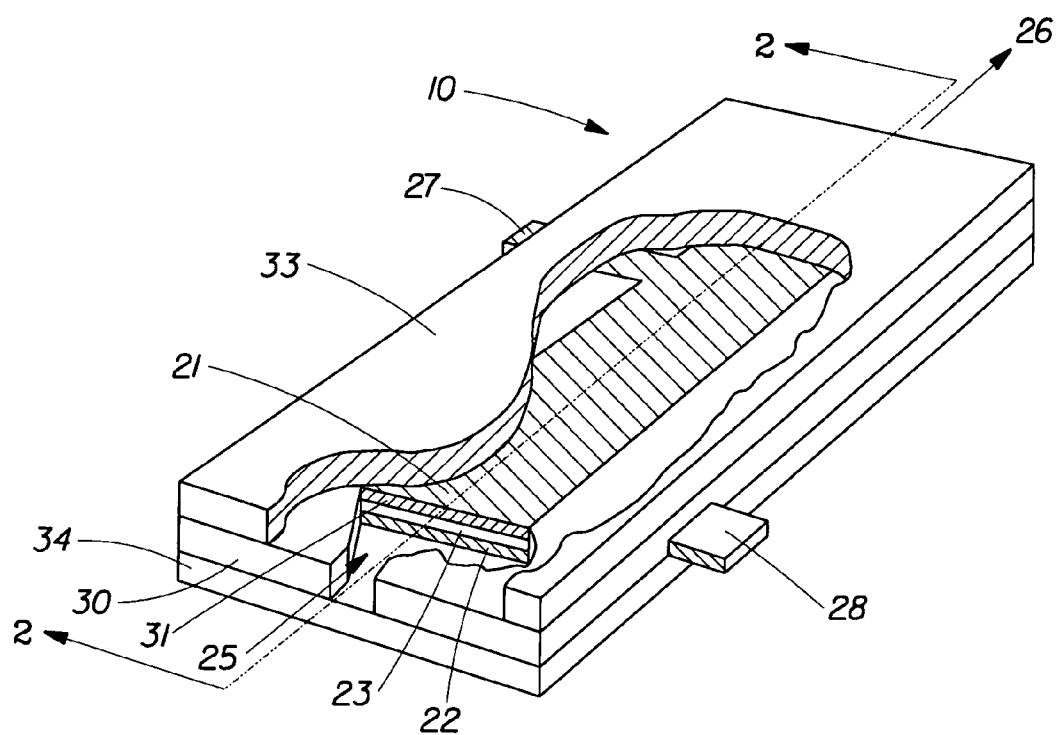
FIG. 1 shows an electrolysis cell used in the practice of the present invention.

The present invention employs an electrical current passing through an aqueous feed solution between an anode and a cathode to convert low levels of salt precursors, whether they are naturally present in water (e.g. rivers or wells) or later dissolved within the solution (e.g. added salts such as NaCl). When an aqueous solution flows through the chamber of the electrolysis cell, and electrical current is passed between the anode and the cathode, several chemical reactions occur that involve the water, as well as one or more of the other salts or ions contained in the aqueous solution.

At the anode, within a narrow layer of the aqueous solution in the passage adjacent to the anode surface, the following chlorine generating reaction occurs:

$2\,Cl^- \Leftrightarrow Cl_2\,(g) + 2e^-$.

Chlorine gas ($Cl_2$) generated by the chlorine reaction dissolves in the water to generate hypochlorite ions ($OCl^-$). Note that several other potential chlorine-oxygen reactions (e.g. chlorine dioxide) may also take place. Without being bound by any particular theory, it is believed that the anode electrode withdraws electrons from the water and other ions adjacent to the anode, which results in the formation of antimicrobial oxidative species in the narrow surface layer of aqueous feed solution. This surface layer, at the anode interface, is believed to be about 100 nanometers in thickness. As a result, the smaller gap size has led to higher efficiency conversion than a larger gap size. Of course, a certain limitation will exist as which point it is no longer possible to flow the aqueous solution without significant back pressure or the gap is so small that a very large current is drawn due to the low resistance between the electrodes. Flow dynamics, which include the movement of molecules in a flowing solution by turbulence, predict that the conversion of salts will increase as the solution flow path nears the anode surface layer. Consequently, electrolysis cells and electrolysis systems of the present invention preferably maximize the flow of the aqueous feed solution through this surface layer adjacent the anode, in order to maximize the conversion of antimicrobial oxidants. Additionally, the removal of the membrane, that typically separates the anode and cathode compartment, also increases the reaction rate by preventing the slow migration of ions across this membrane.

The present invention relates to the production of one or more mixed oxidant products and can include hypochlorite, chlorine, chlorine dioxide, ozone, hydrogen peroxide, and several other chlor-oxigenated species.

The aqueous feed solution comprises of an electrolytic solution made of at least one halide salt, which for simplicity will be exemplified herein after by the most preferred halide salt, sodium chloride. Sodium chloride is a salt ordinarily found in tap water, well water, and other water sources. Consequently, there is usually sufficient chloride ion in the water to yield a desired concentration of mixed oxidants. It is also possible that an amount of the sodium chloride salt is added into the aqueous feed solution at a desired concentration generally of at least 0.1 ppm.

The level of chloride salt comprised in the aqueous feed solution can be selected based on the level of disinfection required by the chlorine containing species (e.g. hypochlorite), in addition to the conversion efficiency of the electrolysis cell to convert the sodium chloride to the mixed oxidant products. The level of sodium chloride naturally present or added is generally from about 1 ppm to about 500 ppm. For disinfection of a water source, a sodium chloride level is preferably from about 1 ppm to about 300 ppm, and more preferably about 10 ppm to about 200 ppm. The resulting mixed oxidant product level is from about 0.1 ppm to about 10 ppm, preferably from about 1 ppm to about 2 ppm The range of mixed oxidant conversion from the chloride salt that is achievable in the electrolysis cells of the present invention generally ranges from less than about 1% to about 99%. The level of conversion is dependent most significantly on the design of the electrolysis cell, herein after described, as well as on the electrical current properties used in the electrolysis cell.

The aqueous feed solution can optionally comprise one or more other salts in addition to the sodium chloride. These optional salts can be used to enhance the disinfection performance of the effluent that is discharged from the electrolysis cell, or to provide other mixed oxidants in response to the passing of electrical current through the electrolysis cell. Another preferred salt is sodium bromide. A preferred apparatus and method for electrolyzing aqueous solutions comprising alkali halides is disclosed in co-pending, commonly assigned U.S. provisional patent application 60/280,913 (Docket 8492P), filed on Apr. 2, 2001. Other preferred salts consist of alkali halite, and most preferably sodium chlorite. A preferred apparatus and method for electrolyzing aqueous solutions comprising alkali halites is disclosed in as exampled in U.S. patent application Ser. No. 09/947,846 which is hereby incorporated by reference.

The present invention can optionally use a local source of chloride salt, and a means for delivering the chloride salt to the aqueous feed solution. This embodiment is advantageously used in those situations when the target water to be treated with the electrolysis cell does not contain a sufficient amount, or any, of the chloride salt. The local source of chloride salt can be released into a stream of the aqueous solution, which then passes through the electrolysis cell. The local source of chloride salt can also be released into a portion of a reservoir of aqueous solution, which portion is then drawn into the electrolysis cell. Preferably, all the local source of chloride salt passes through the electrolysis cell, to maximize the conversion to mixed oxidants, and to limit the addition of salts to the reservoir generally. The local source of chloride salt can also supplement any residual levels of chloride salt already contained in the aqueous solution.

The local source of chloride salt can be a concentrated brine solution, a salt tablet in fluid contact with the reservoir of electrolytic solution, or both. A preferred local source of chloride salt is a solid or powdered material. The means for delivering the local source of chloride salt can comprise a salt chamber comprising the chloride salt, preferably a pill or tablet, through which a portion of the aqueous solution passes, thereby dissolving a portion of the chloride salt to form the aqueous feed solution. The salt chamber can comprise a salt void formed in the body of the device that holds the electrolysis cell, which is positioned in fluid communication with the portion of aqueous solution that will pass through the electrolysis cell.

Any water source can be used to form the aqueous feed solution, including well water, tap water, softened water, and industrial process water, and waste waters. However, for many applications of the invention, un-treated water, such as river water or well water is most preferred to form an effluent solution with essentially only naturally present chloride ions present. Since these types of natural water contain sufficient amounts of salts, including sodium chloride, appreciable amounts of mixed oxidants will be formed.

The addition of other salts or electrolytes into the selected water source will increase the conductivity of the water, which will increase the amount of mixed oxidants produced. However, the increase in conductivity may not result in higher productivity efficiency, since the increase in conductivity will increase the current draw. Therefore, while more mixed oxidants will be produced, more power will be drawn. A suitable mixed oxidant productivity equation is expressed by equation I, $$\eta = (CMO * Q)/(I * V) \quad (I)$$

wherein:

$\eta$ units are micrograms of mixed oxidant per minute, per watt of power used;

CMO is the concentration of the generated mixed oxidants in milligrams per liter (mg/l);

I is the electric current in amps;

Q is the volumetric flow rate in milliliters per minute (ml/m); and

V is electric potential across the cell in volts.

The aqueous feed solution containing the sodium chloride can be fed to the electrolysis cell from a batch storage container. Alternatively, the feed solution can be prepared continuously by admixing a concentrated aqueous solution of sodium chloride with a second water source, and passing continuously the admixture to the electrolysis cell. Optionally, a portion of the aqueous feed solution can comprise a recycled portion of the effluent from the electrolysis cell. And, the aqueous feed solution can comprise a combination of any of the forgoing sources. The aqueous feed solution can flow continuously or periodically through the electrolysis cell.

Electrolysis Cell

The electrolysis cell generates mixed oxidants from the chloride ions by flowing electrical current through the aqueous feed solution that passes through the cell chamber. The non-barrier electrolytic cell comprises at least a pair of electrodes, an anode and a cathode. The cell also comprises a cell chamber through which the aqueous feed solution passes, and includes a passage that is adjacent to the anode. The passage includes the narrow surface layer adjacent to the anode surface where the conversion reaction occurs. It is preferred to pass as much of the mass of the aqueous effluent solution through the passage and its narrow anode surface region as possible.

In one embodiment of the present invention, the cell comprises an anode and a confronting (and preferably, co-extensive) cathode that are separated by a cell chamber that has a shape defined by the confronting surfaces of the pair of electrodes. The cell chamber has a cell gap, which is the perpendicular distance between the two confronting electrodes. Typically, the cell gap will be substantially constant across the confronting surfaces of the electrodes. The cell gap is preferably 0.5 mm or less, more preferably 0.2 mm or less.

The electrolysis cell can also comprise two or more anodes, or two or more cathodes. The anode and cathode plates are alternated so that an anode is confronted by a cathode on each face, with a cell chamber there between. Examples of electrolysis cells that can comprise a plurality of anodes and cathodes are disclosed in U.S. Pat. No. 5,534,120, issued to Ando et al. on Jul. 9, 1996, and U.S. Pat. No. 4,062,754, issued to Eibl on Dec. 13, 1977, which are incorporated herein by reference.

Generally, the electrolysis cell will have one or more inlet openings in fluid communication with each cell chamber, and one or more outlet openings in fluid communication with the chambers. The inlet opening is also in fluid communication with the source of aqueous feed solution, such that the aqueous feed solution can flow into the inlet, through the chamber, and from the outlet of the electrolysis cell. The effluent solution (the electrolyzed aqueous feed solution that exits from the electrolysis cell) comprises an amount f mixed oxidant that was converted within the cell passage in response to the flow of electrical current through the solution. The effluent solution can be used as a source of mixed oxidants, for example, for disinfecting articles, or for treating other volumes of water or aqueous solutions. The effluent can itself be a treated solution, where the feed solution contains microorganisms or some other oxidizable source material that can be oxidized in situ by the mixed oxidant solution that is formed.

The present invention also provides a mixed oxidant generating system, comprising:

a) a source of an aqueous feed solution comprising a halide salt;

b) a non-membrane electrolysis cell having a cell chamber, and comprising an anode and a cathode, the cell chamber having a passage adjacent to the anode, and an inlet and an outlet in fluid communication with the cell chamber;

c) a means for passing the aqueous feed solution into the cell chamber, along the passage, and out of the outlet; and d) an electric current supply to flow a current through the aqueous solution in the chamber, to convert a portion of the halide salt in the passage to mixed oxidants, and thereby form an aqueous effluent comprising of mixed oxidants.

Figure 2:
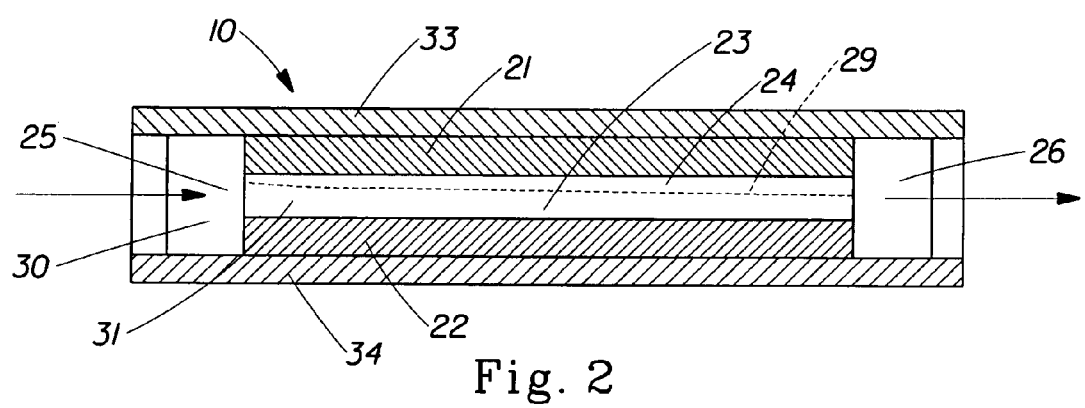
FIG. 2 shows a sectional view of the electrolysis cell of FIG. 1 though line 2-2.

FIG. 1 and FIG. 2 show an embodiment of an electrolysis cell 10 of the present invention. The cell comprises an anode 21 electrode, and a cathode 22 electrode. The electrodes are held a fixed distance away from one another by a pair of opposed non-conductive electrode holders 30 having electrode spacers 31 that space apart the confronting longitudinal edges of the anode and cathode to form a cell chamber 23 having a chamber gap. The chamber 23 has a cell inlet 25 through which the aqueous feed solution can pass into of the cell, and an opposed cell outlet 26 from which the effluent can pass out of the electrolysis cell. The assembly of the anode and cathode, and the opposed plate holders are held tightly together between a non-conductive anode cover 33 (shown partially cut away) and cathode cover 34, by a retaining means (not shown) that can comprise non-conductive, waterproof adhesive, bolts, or other means, thereby restricting exposure of the two electrodes only to the electrolysis solution that flows through the chamber 23. Anode lead 27 and cathode lead 28 extend laterally and sealably through channels made in the electrode holders 30.

FIG. 2 shows cell chamber 23 and the passage 24 along the anode 21 surface. The passage 24 is a portion of the cell chamber 23, though it is shown with a boundary 29 only to illustrate its adjacent to the anode 21, and not to show the relative proportion or scale relative to the cell chamber.

Figure 3:
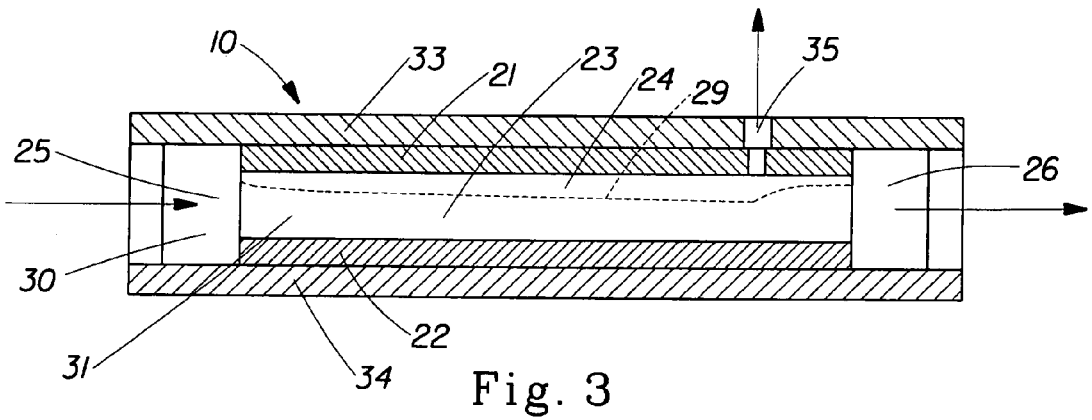
FIG. 3 shows a sectional view of an alternative electrolysis cell used in the practice of the present invention.

Another embodiment of the electrolysis cell of the present invention is shown in FIG. 3. This electrolysis cell has an anode outlet 35. The anode outlet removes a portion of the electrolyzed feed solution flowing in the passage 24 adjacent the anode 21 as an anode effluent. The remainder of the cell effluent exits from the cell outlet 26, which hereafter will also be referred to as the cathode effluent and the cathode outlet, respectively. Similar electrolysis cells that remove a portion of the electrolyzed solution flowing adjacent the anode through an anode outlet are described in U.S. Pat. No. 5,316,740, issued to Baker et al. on May 31, 1994, U.S. Pat. No. 5,534,120 issued to Ando et al. on Jul. 9, 1996, and U. S. Patent 5,858,201, issued to Otsuka et al. on Jan. 12, 1999. Particularly preferred is an electrolysis cell as shown in FIG. 3 of U.S. Pat. No. 4,761,208 that uses a physical barrier (element 16) positioned between the anode and the cathode adjacent the outlet, whereby mixing of the solution adjacent the anode with the solution adjacent the cathode can be minimized or eliminated prior to removal through the anode outlet. Preferably, the cathode effluent, which will comprise a low level or no mixed oxidant product, is passed back to and mixed into the aqueous feed solution.

An electrode can generally have any shape that can effectively conduct electricity through the aqueous feed solution between itself and another electrode, and can include, but is not limited to, a planar electrode, an annular electrode, a spring-type electrode, and a porous electrode. The anode and cathode electrodes can be shaped and positioned to provide a substantially uniform gap between a cathode and an anode electrode pair, as shown in FIG. 2. On the other hand, the anode and the cathode can have different shapes, different dimensions, and can be positioned apart from one another non-uniformly. The important relationship between the anode and the cathode is for a sufficient flow of current through the anode at an appropriate voltage to promote the conversion of the halide salt to mixed oxidants within the cell passage adjacent the anode.

Planar electrodes, such as shown in FIG. 2, have a length along the flow path of the solution, and a width oriented transverse to the flow path. The aspect ratio of planar electrodes, defined by the ratio of the length to the width, is generally between 0.2 and 10, more preferably between 0.1 and 6, and most preferably between 2 and 4.

The electrodes, both the anode and the cathode, are commonly metallic, conductive materials, though non-metallic conducting materials, such as carbon, can also be used. The materials of the anode and the cathode can be the same, but can advantageously be different. To minimize corrosion, chemical resistant metals are preferably used. Examples of suitable electrodes are disclosed in U.S. Pat. No. 3,632,498 and U.S. Pat. No. 3,771,385. Preferred anode metals are stainless steel, platinum, palladium, iridium, ruthenium, as well as iron, nickel and chromium, and alloys and metal oxides thereof. More preferred are electrodes made of metals such as titanium, tantalum, aluminum, zirconium, tungsten or alloys thereof, which are coated or layered with a Group VIII metal that is preferably selected from platinum, iridium, and ruthenium, and oxides and alloys thereof. One preferred anode is made of titanium core and coated with, or layered with, ruthenium, ruthenium oxide, iridium, iridium oxide, and mixtures thereof, having a thickness of at least 0.1 micron, preferably at least 0.3 micron.

For many applications, a metal foil having a thickness of about 0.03 mm to about 0.3 mm can be used. Foil electrodes should be made stable in the cell so that they do not warp or flex in response to the flow of liquids through the passage that can interfere with proper electrolysis operation. The use of foil electrodes is particularly advantageous when the cost of the device must be minimized, or when the lifespan of the electrolysis device is expected or intended to be short, generally about one year or less. Foil electrodes can be made of any of the metals described above, and are preferably attached as a laminate to a less expensive electrically-conductive base metal, such as tantalum, stainless steel, and others.

A particularly preferred anode electrode of the present inventions is a porous, or flow-through anode. The porous anode has a large surface area and large pore volume sufficient to pass there through a large volume of aqueous feed solution. The plurality of pores and flow channels in the porous anode provide a greatly increased surface area providing a plurality of passages, through which the aqueous feed solution can pass. Porous media useful in the present invention are commercially available from Astro Met Inc. in Cincinnati, Ohio, Porvair Inc. in Henderson, N.C., or Mott Metallurgical in Farmington, Conn. Alternately U.S. Pat. Nos. 5,447,774 and 5,937,641 give suitable examples of porous media processing. Preferably, the porous anode has a ratio of surface area (in square centimeters) to total volume (in cubic centimeters) of more than about 5 $cm^{-1}$, more preferably of more than about 10 $cm^{-1}$, even more preferably more than about 50 $cm^{-1}$ and most preferably of more than about 200 $cm^{-1}$. Preferably the porous anode has a porosity of at least about 10%, more preferably of about 30% to about 98%, and most preferably of about 40% to about 70%. Preferably, the porous anode has a combination of high surface area and electrical conductivity across the entire volume of the anode, to optimize the solution flow rate through the anode, and the conversion of chloride salt contained in the solution to the mixed oxidant product.

The flow path of the aqueous feed solution through the porous anode should be sufficient, in terms of the exposure time of the solution to the surface of the anode, to convert the chloride salt to the mixed oxidant. The flow path can be selected to pass the feed solution in parallel with the flow of electricity through the anode (in either the same direction or in the opposite direction to the flow of electricity), or in a cross direction with the flow of electricity. The porous anode permits a larger portion of the aqueous feed solution to pass through the passages adjacent to the anode surface, thereby increasing the proportion of the halogen salt that can be converted to the halogen containing mixed oxidant product.

Figure 4:
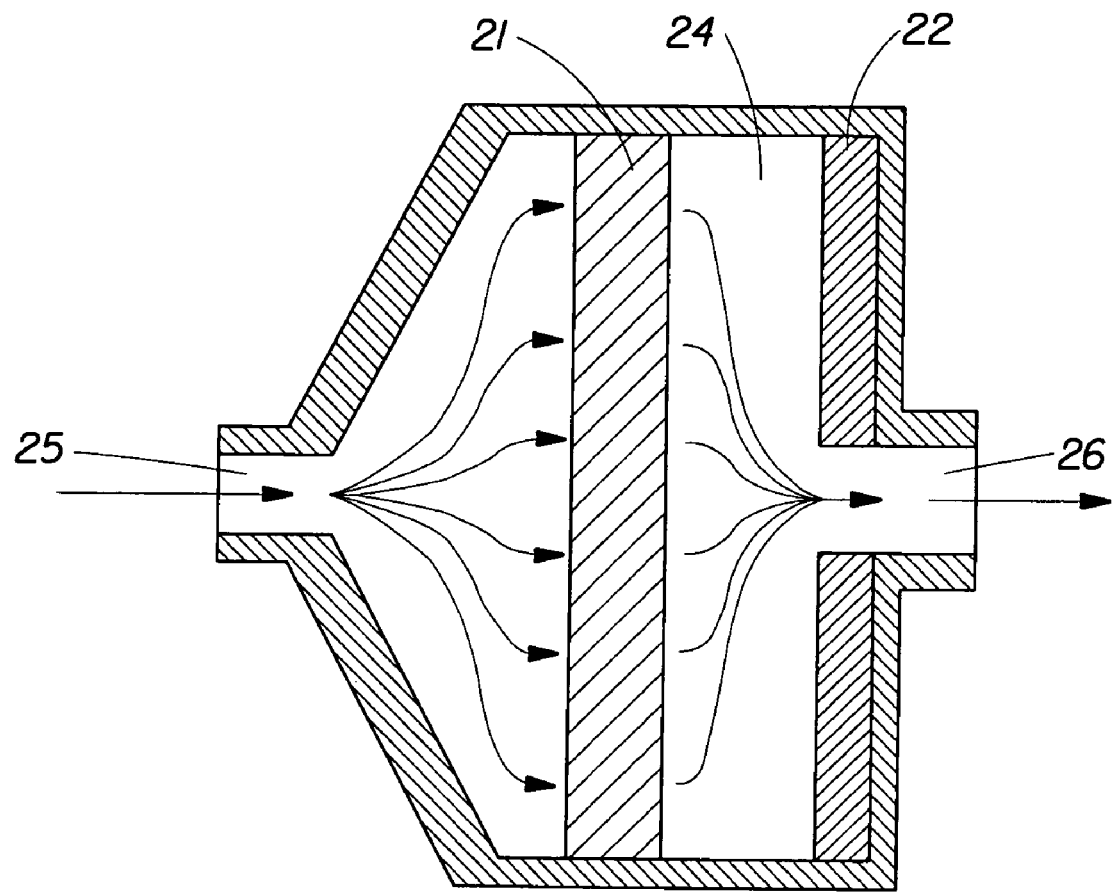
FIG. 4 is a sectional view of another electrolysis cell having a porous anode.

FIG. 4 shows an electrolysis cell comprising a porous anode 21. The porous anode has a multiplicity of capillary-like flow passages 24 through which the aqueous feed solution can pass adjacent to the anode surfaces within the porous electrode. In the electrolysis cell of FIG. 4, the aqueous feed solution flows in a parallel direction to the flow of electricity between the anode and the cathode.

Figure 5:
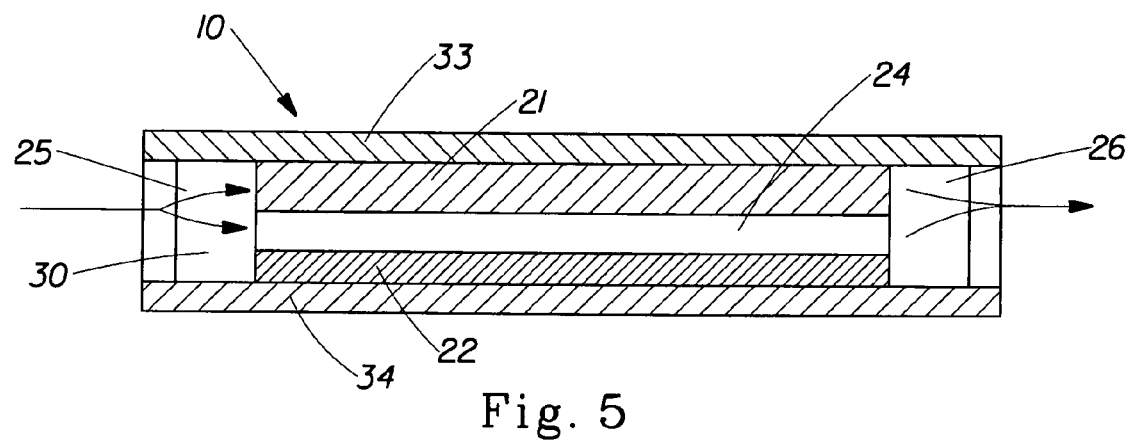
FIG. 5 is a sectional view of yet another electrolysis cell having a porous anode.

Another embodiment of an electrolysis cell having a porous anode is shown in FIG. 5. In this embodiment, the flow of aqueous feed solution is in a cross direction to the flow of electricity between the anode and the cathode. Because the flow passages through the porous anode are generally small (less than 0.2 mm), the flow of a unit of solution through a porous anode will require substantially more pressure that the same quantity flowing through an open cell chamber. Consequently, if aqueous feed solution is introduced into an electrolysis cell having a porous anode and an open chamber, generally the amount of solution flowing through the porous anode and across its surfaces will be significantly diminished, since the solution will flow preferentially through the open cell chamber.

Figure 6:
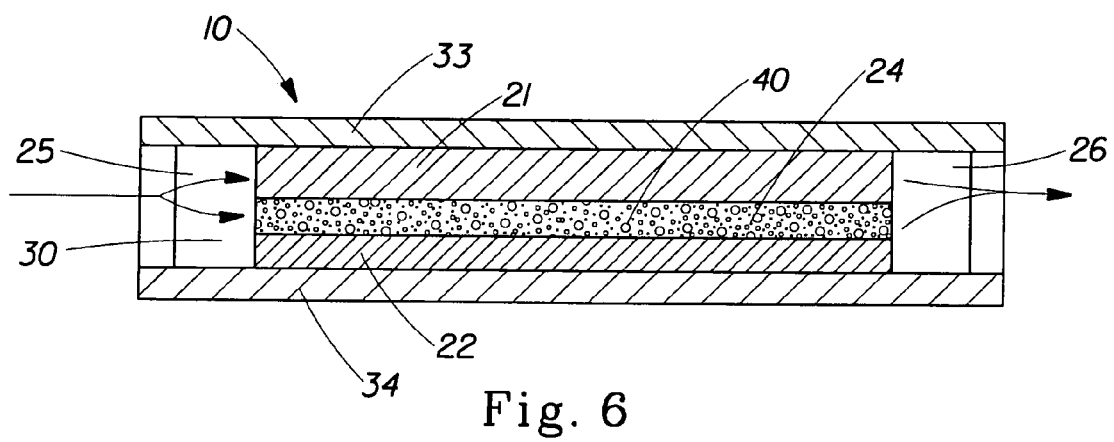
FIG. 6 is a sectional view of another electrolysis cell having a porous anode and a porous flow barrier.
Figure 7:
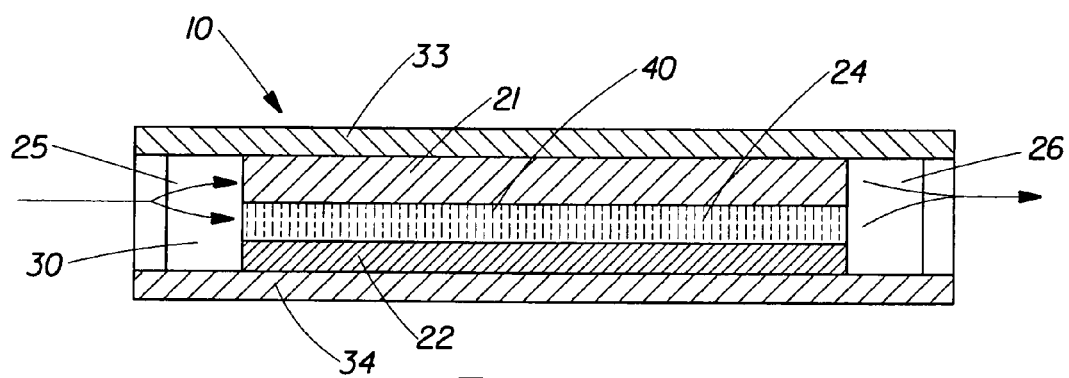
FIG. 7 is a sectional view of yet another electrolysis cell having a porous anode and a porous flow barrier.

To address the above problem where the aqueous feed solution can by-pass the porous anode, the cell chamber is preferably provided, as shown in FIG. 6, with a non-conducting, porous flow barrier 40, within the volume of the cell chamber 24 between the cathode 22 and the porous anode 21. The porous barrier 40 is non-conducting, to prevent electricity from short-circuiting between the anode and the cathode via the chamber material. The porous barrier exerts a solution pressure drop as the aqueous feed solution flows through the cell chamber. The porous barrier should not absorb or retain water, and should not react with the aqueous solution and chemical ingredients therein, including the mixed oxidant products. The porous barrier 40 can be made of a non-conducting material selected from, but not limited to, plastics such as polyethylene, polypropylene, and polyolefin, glass or other siliceous material, and silicon. The porous barrier can comprise a plurality of spheres, ovals, and other shaped objects of the same size or of different sizes, that can be packed loosely, or as a unified matrix of articles, into the chamber. FIG. 6 shows the porous barrier 40 as a matrix of spherical objects of varying diameters. The porous barrier 40 can also be one or more baffles, which substantially restrict the flow of the solution through the cell chamber 24. As shown in FIG. 7, such baffles can comprise a series of vertical barriers having apertures therein for restricting the flow of solution. The restricted flow of aqueous feed solution through the non-conducting, porous barrier significantly reduces the proportion of aqueous feed solution that can pass through cell chamber, thereby increasing the proportion of halide salt that is converted in the passages 23 within the porous anode 21.

Figure 8:
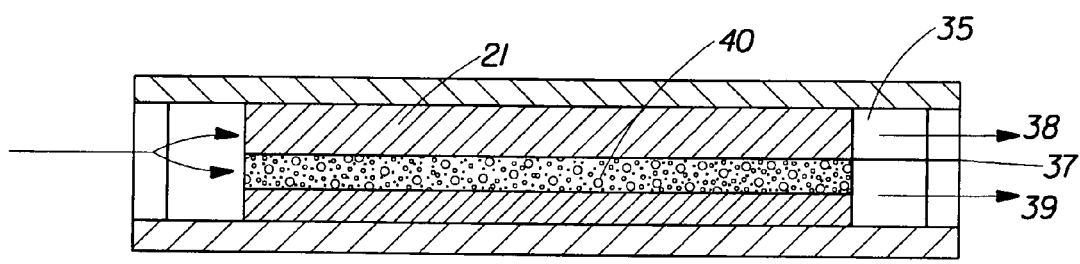
FIG. 8 is a sectional view of still another electrolysis cell having a porous anode and a porous flow barrier.

While the solution flowing through the porous anode and the cell chamber 24 containing the porous barrier 40 can mix and flow back and forth somewhat between each other, the effluents exiting from the different areas of the outlet end 26 of the cell have substantially different solution compositions. The effluent 38 exiting the porous anode will have a significantly lower pH and higher production of halogen product than the effluent 39 exiting the cell chamber adjacent to the cathode. The effluent 38 exiting the porous anode can be separated from the effluent 39 and removed from the cell by placing a barrier 37 as shown in FIG. 8.

Another embodiment of the present invention uses an electrolysis cell that has an open chamber. The open-chamber electrolysis cell is particularly useful in the practice of the invention in reservoirs of aqueous feed solution; including pools, bathtubs, spas, tanks, and other open bodies of water. The aqueous feed solution can flow into the cell and to the anode from various directions. The halide salt in the aqueous feed solution can be contained in the reservoir solution, or can be delivered into the reservoir solution locally as a local source of halide salt, as herein before described. Examples of open-chamber electrolysis cells include those described in U.S. Pat. No. 4,337,136 (Dahlgren), U.S. Pat. No. 5,013,417 (Judd), US 5,059,296 (Sherman), and U.S. Pat. No. 5,085,753 (Sherman).

An alternative system for generating mixed oxidant comprises a batch container containing the aqueous feed solution. A re-circulating pump circulates the feed solution from the container through an electrolysis cell, and discharges the effluent back to the batch container. In time, the concentration of the un-reacted chloride salt in the solution will be reduced to essentially zero, whereby the charged amount of sodium chloride in the aqueous feed solution will have been nearly completely converted to mixed oxidant product. In a slightly different system, the electrolysis cell can be positioned within the batch container, submerged within the aqueous solution comprising the sodium chloride. A pump or mixer within the container forces the solution through the electrolysis cell, and re-circulates the solution until the target conversion of sodium chloride to mixed oxidant is achieved.

The electrolysis cell can also comprise a batch-type cell that electrolyses a volume of the aqueous feed solution. The batch-type cell comprises a batch chamber having a pair of electrodes. The batch chamber is filled with aqueous feed solution comprising the sodium chloride salt, which is then electrolyzed to form a batch of effluent solution containing mixed oxidant. The electrodes preferably comprise an outer annular anode and a concentric inner cathode. An example of a suitable batch cell, for use with a sodium chloride salt supply in accordance with the present invention, is disclosed in WO00/71783-A1, published Nov. 30, 2000, incorporated herein by reference.

Electrical Current Supply

An electrical current supply provides a flow of electrical current between the electrodes and across the passage of aqueous feed solution passing across the anode. For many applications, the preferred electrical current supply is a rectifier of household (or industrial) current that converts common 100-230 volt AC current to DC current.

For applications involving portable or small, personal use systems, a preferred electrical current supply is a battery or set of batteries, preferably selected from an alkaline, lithium, silver oxide, manganese oxide, or carbon zinc battery. The batteries can have a nominal voltage potential of 1.5 volts, 3 volts, 4.5 volts, 6 volts, or any other voltage that meets the power requirements of the electrolysis device. Most preferred are common-type batteries such as "AA" size, "AAA" size, "C" size, and "D" size batteries having a voltage potential of 1.5 V. Two or more batteries can be wired in series (to add their voltage potentials) or in parallel (to add their current capacities), or both (to increase both the potential and the current). Re-chargeable batteries and mechanical wound-spring devices can also be advantageously employed.

Another alternative is a solar cell that can convert (and store) solar power into electrical power. Solar-powered photovoltaic panels can be used advantageously when the power requirements of the electrolysis cell draws currents below 2000 milliamps across voltage potentials between 1.5 and 9 volts. Many other known power sources may be used in practicing this invention including, but not limited to, manual-crank generator systems and water pressure/flow turbine systems.

In one embodiment, the electrolysis cell can comprise a single pair of electrodes having the anode connected to the positive lead and the cathode connected to the negative lead of the battery or batteries. A series of two or more electrodes, or two or more cells (each a pair of electrodes) can be wired to the electrical current source. Arranging the cells in parallel, by connecting each cell anode to the positive terminal(s) and each cell cathode to the negative terminal(s), provides the same electrical potential (voltage) across each cell, and divides (evenly or unevenly) the total current between the two or more electrode pairs. Arranging two cells (for example) in series, by connecting the first cell anode to the positive terminal, the first cell cathode to the second cell anode, and the second cell cathode to the negative terminal, provides the same electrical current across each cell, and divides the total voltage potential (evenly or unevenly) between the two cells.

The electrical current supply can further comprise a circuit for periodically reversing the output polarity of the battery or batteries in order to maintain a high level of electrical efficacy over time. The polarity reversal minimizes or prevents the deposit of scale and the plating of any charged chemical species onto the electrode surfaces. Polarity reversal functions particularly well when using confronting anode and cathode electrodes.

Electrolysis Effluent

In most applications, the microorganisms in the contaminated solution are killed as the solution, which already contains chloride salt, is passed through the electrolysis device. In other applications, the discharged effluent containing the converted mixed oxidants is removed from the electrolysis cell and is used, for example, as an aqueous disinfection solution. The effluent can be used as-made by direct delivery to an oxidizable source that is oxidized by the mixed oxidants. The oxidizable source can be a second source of water or other aqueous solution comprising microorganisms are destroyed when mixed or contacted with the effluent solution. Microorganisms contained within the aqueous feed solution would also be destroyed.

Impurity Removal

Water impurities come in many forms. In some cases they are of microbial nature and may be viral, bacterial, fungal, parasitic or other biological forms. The removal of some or all of these impurities may be assisted with a filter before or after the electrolytic cell. Of particular interest is the removal of 99.95% cyst organisms, such as cryptosporidium, which would be removed from the contaminated water if the effective filtration size of the filter is less than the size of the cysts (e.g. a filter capable of removing particulates greater than 3 microns).

The impurities may also be non microbial. It may also be possible to remove some of these impurities via a filter by size. In some cases, the contamination in water may also be of organic or inorganic nature. It would also be desirable for a filter to remove some or all of the organic or inorganic contaminants. In other cases we may also want to convert the form of the organic or inorganic species to one that is more easily removed via filtration. For example, arsenic (As) may exists in one of two oxidation levels (As(III) and As(V)). Generally, it is thought that As (III) is the more toxic form, but both oxidation levels have negative health consequences. The oxidation state of As likely to be found in water varies with the source. Surface water normally has a higher percentage of As (V) than ground water owing to air oxidation. The structures of inorganic As(III) (arsenite) and As(V) (arsenate), plus their corresponding acid dissociation constants, are shown below.

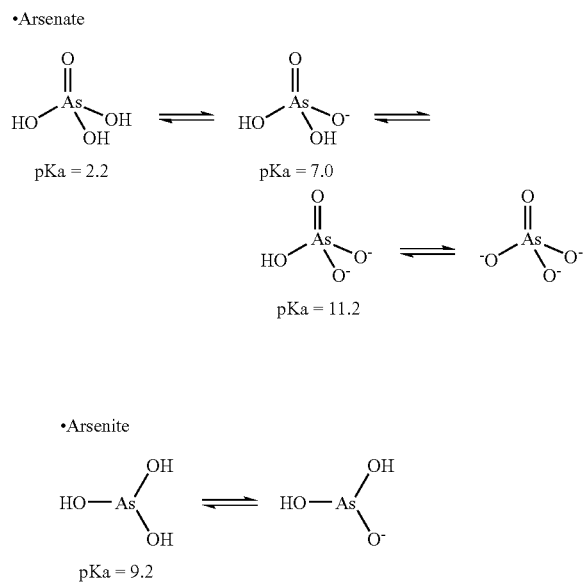

Note that at the pH of drinking water, As (V) will exist as either a mono or divalent anion, whereas As(III) will exist as a neutral molecule. This suggests that As(V), but not As(III), would easily be removed from water by anion exchange resins. Therefore, if As(III) could easily be oxidized to As (V), ion exchange would represent an excellent treatment option for the removal of As. With a typical strong base ion exchange resin the selectivity for the removal of anions likely to be found in water lies in the following order (easiest to hardest): sulfate>arsenate >nitrate>arsenite>chloride>bicarbonate.

There are some situations where the filter may consist, in part or in total, of an ion exchange resin as a pre-treatment to the electrolytic solution entering the electrolytic cell. It would be of particular interest for the ion exchange resin to yield an effluent that increases the halide ion concentration in the electrolytic solution prior to electrolysis, for example, by the use of an anion exchange resin in the chloride form. The use of a cation exchange resin can minimize the concentration of scale forming ions such as calcium and magnesium in the electrolysis cell, thus minimizing the need for cleaning the anode (s) and cathode (s).

EXAMPLES

Figure 9:
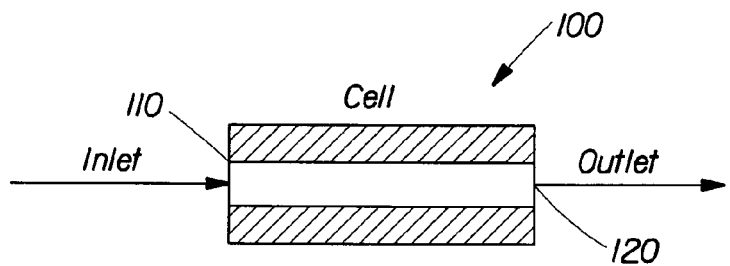
FIG. 9 is a block diagram of a flow cell configuration.

FIG. 9 depicts a non-limiting exemplary embodiment of a flow cell 100. Flow cell 100 may include an inlet 110 and an outlet 120. One may use a low powered (preferably, portable) electrolysis flow cell that can use the current and voltage delivered by conventional household batteries. The electrolysis cells can come in various sizes, with anodes having a surface area of from about 0.1 cm$^2$ to about 60 cm$^2$. One particularly preferred embodiment of the present invention comprises an electrolysis cell with an anode having a surface area of from about 1 cm$^2$ to about 20 cm$^2$, more preferably from about 3 cm$^2$ to about 10 cm$^2$. An electrically driven motorized pump can pump the solution to the electrolysis cell via a flow cell configuration. Such pump units will typically flow at rates from about 100 to about 300 cc/min. of solution.

Figure 10:
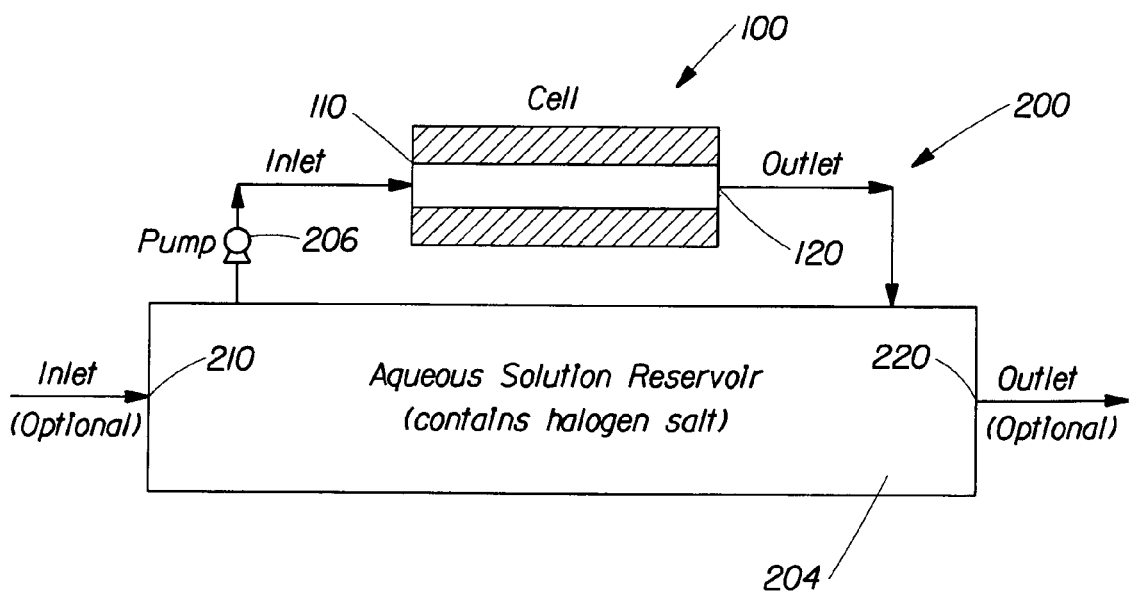
FIG. 10 is a block diagram of a recirculation cell configuration.

FIG. 10 depicts a non-limiting exemplary embodiment of a re-circulation cell 200, which includes cell 100. Recirculation cell 200 may include an aqueous solution reservoir 204. Reservoir 204 may contain an aqueous feed solution comprising a halogen salt. The solution leaving outlet 120 may be introduced into reservoir 204 whereby the solution will mix with the aqueous feed solution resulting into a build-up of the desired electrolyzed species. Once the both of these solutions are mixed, they are introduced into inlet 110. Both solutions may be moved about by any currently known methods for moving like materials including but not limited to pump 206. Optionally, reservoir 204 may include an inlet 210 and an outlet 220 to allow the introduction of additional aqueous feed solution and the exiting of electrolyzed solution so that it may be utilized.

Figure 11:
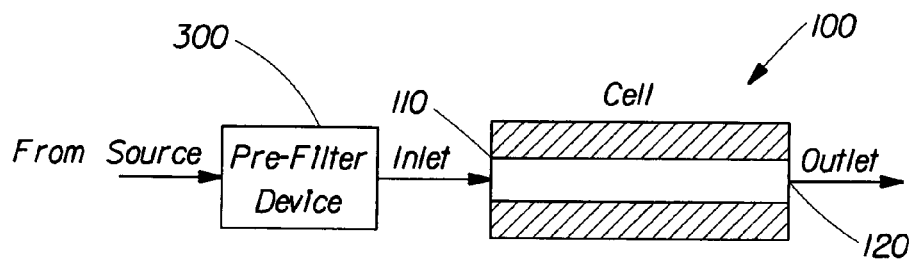
FIG. 11 is a block diagram of a flow cell having a filter mechanism.

FIG. 11 depicts a non-limiting exemplary embodiment of a flow cell 100. Flow cell 100 may include a prefilter device 300. Prefilter device 300 may be used to filter out a variety of undesired components including, but not limited to, sediments, particulates, insoluble materials, large organisms (e.g. cyst) from an aqueous feed solution. Filter mechanism 300 may be constructed of a variety of materials to achieved the desired benefits including, but not limited to, granulated activated carbon filter, granulated activated carbon block, activated carbon fibers, diatomaceous earth glass fibers, filter paper, ion exchange resins, size exclusion materials, charged-modified materials (an example illustrated in WO0107090A1 and thus is herein incorporated by reference), zeolites, activated alumina, silica gel, calcium sulfate, fuller's earth, and activated bauxite. It may be further desirable to remove 99.95% of particulates having a size of at least 3 microns or greater from the electrolytic solution for applications involving drinking water in order to meet ANSI/NSF standard 53.

Figure 12:
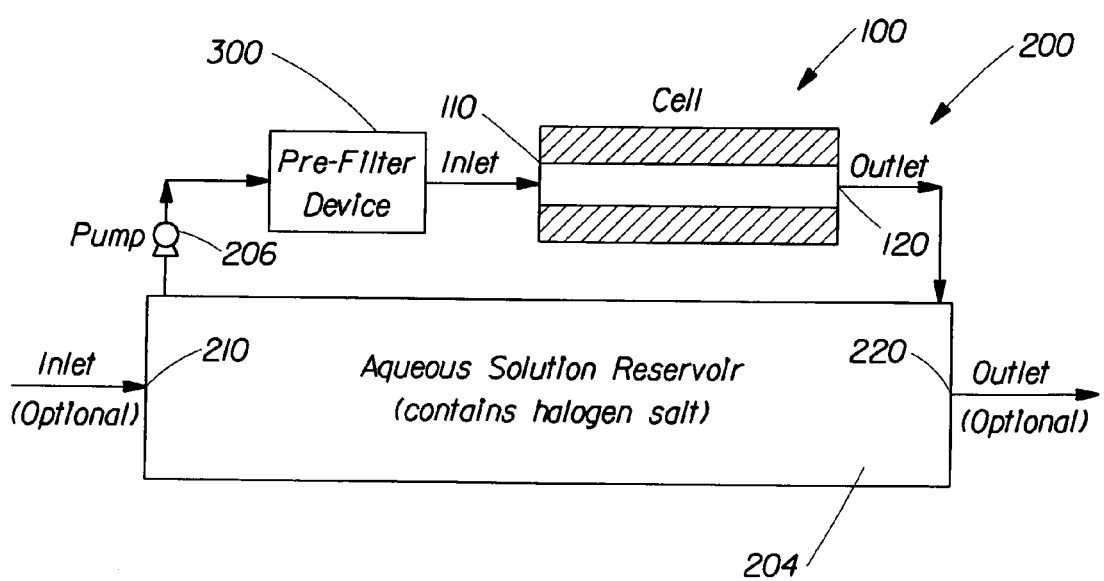
FIG. 12 is a block diagram of a recirculation cell having a filter mechanism.

FIG. 12 depicts a non-limiting exemplary embodiment of a re-circulation cell 200 similar to that shown in FIG. 10 but also including a filter mechanism similar to that shown in FIG. 11.

Figure 13:
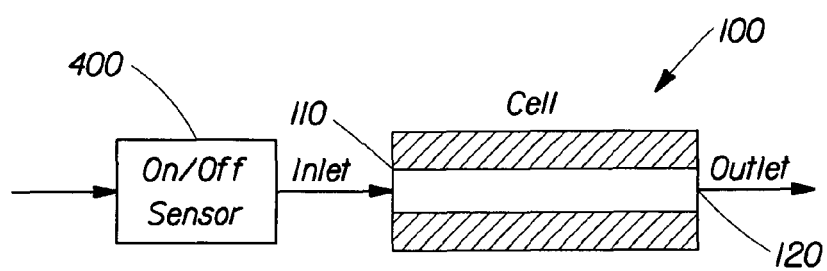
FIG. 13 is a block diagram of a flow cell having an off/on sensor.

FIG. 13 depicts a non-limiting exemplary embodiment of a flow cell 100. Flow cell 100 may include an on-off sensor 400. On-off sensor 400 may be used to detect the presence of an incoming aqueous feed solution and in response may turn on the power supply (not shown), which is used as the electrical power needed for electrolyzing the aqueous solution. In a similar fashion, on-off sensor may detect the absence of an incoming aqueous feed solution and in response may turn off the power supply (not shown).

Figure 14:
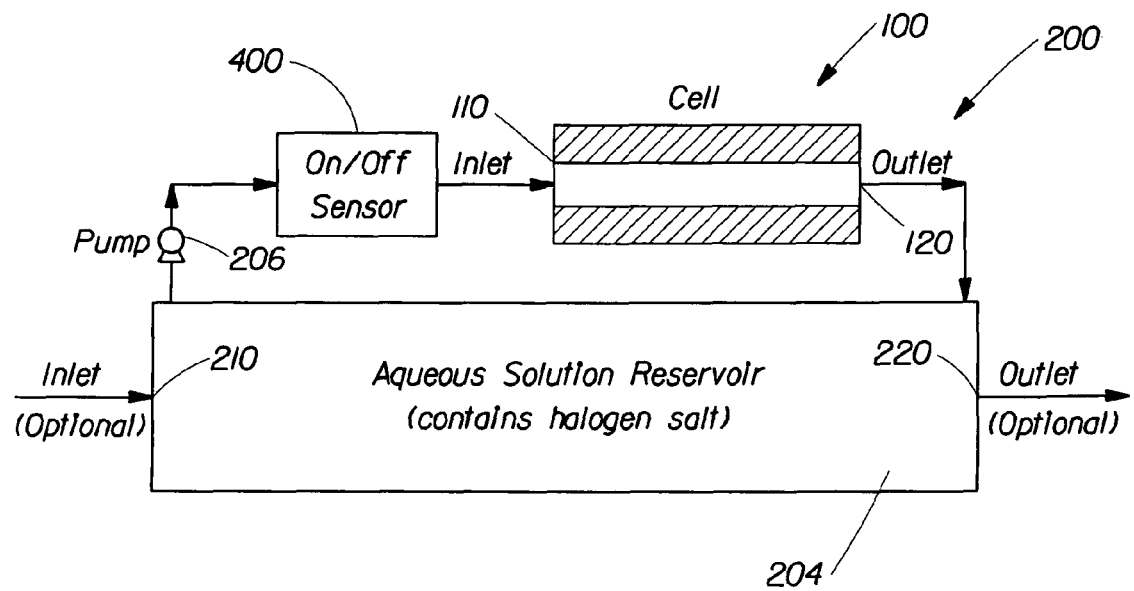
FIG. 14 is a block diagram of a recirculation cell having an off/on sensor.

FIG. 14 depicts a non-limiting exemplary embodiment of a re-circulation cell 200 similar to that shown in FIG. 10 but also including an on-off sensor similar to that shown in FIG. 13.

Figure 15:
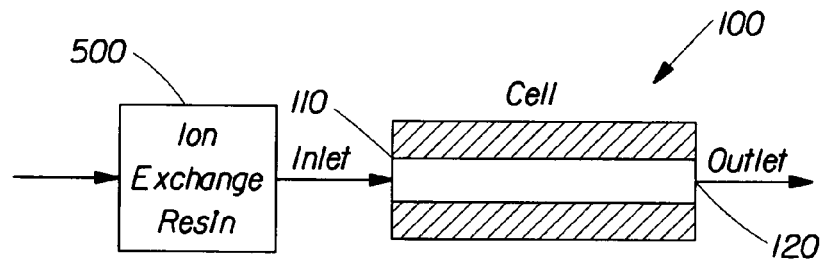
FIG. 15 is a block diagram of a flow cell having an ion exchange resin.

FIG. 15 depicts a non-limiting exemplary embodiment of a block diagram of a flow cell having an ion exchange resin 500. This ion exchange resin may serve two purposes. First, it may serve as a water softener to reduce the total hardness of the water passing through cell 100. Secondly, it may serve as a halide anion exchanger whereby anion exchange resin would be used to exchange anion halide ions for non-halide ions naturally present in the water to increase the efficiency of the system. An example of a halogen anion that could be exchanged readily for most anions in water is chloride.

A water softener is designed to reduce the total hardness of water. Total hardness may be measured chemically by the amount of calcium bicarbonate and magnesium bicarbonate content of the water. A water softener is a specific type of ion exchange resin water conditioner. Typically, cation exchange resin is used to exchange calcium and magnesium cation in the water for other, normally monovalent, cations. The most common exchange ions are sodium or hydrogen ions. Most water softening systems also include a means for regenerating the cation exchange resin bed. The most common method for regeneration of the resin is a brine solution flush. Sodium chloride salt is normally used for this purpose.

Figure 16:
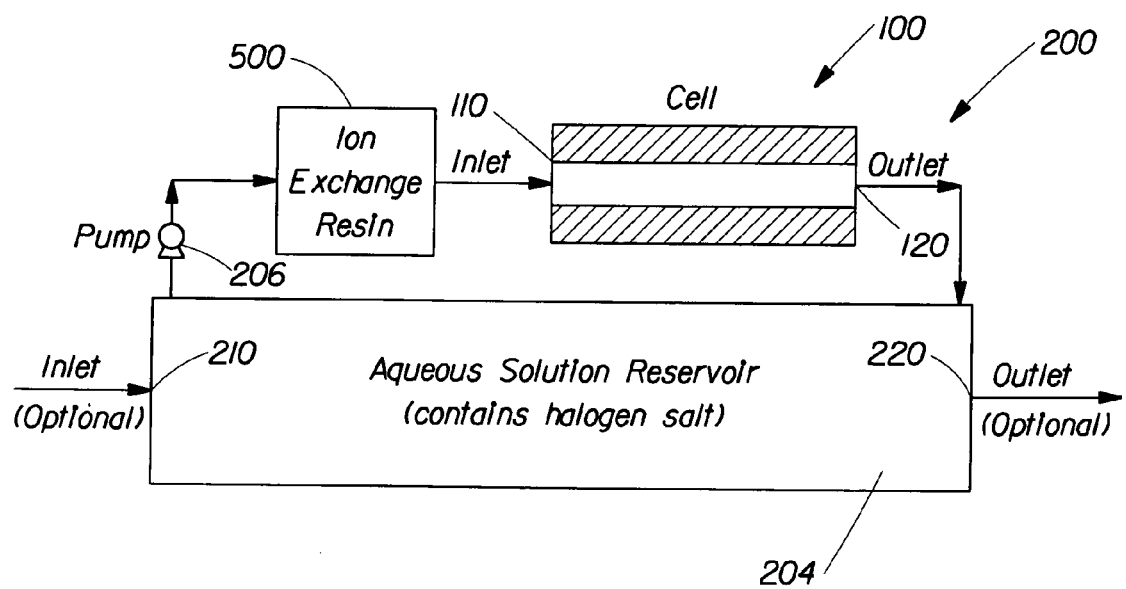
FIG. 16 is a block diagram of a recirculation cell having an ion exchange resin.

FIG. 16 depicts a non-limiting exemplary embodiment of a re-circulation cell 200 similar to that shown in FIG. 10 but also including an ion exchange resin 500 similar to that shown in FIG.15.

Example 1

Flow Cell and Naturally Present Salt in Water

An electrolysis cell of the general design shown in FIG. 9 was used to treat de-chlorinated tap water. The electrolysis cell had a pair of confronting electrodes having a passage gap of about 0.46 mm. The anode was made of ES300—titanium, coated with ruthenium oxide and iridium oxide. The cathode was made of 201 stainless steel. The dimensions of the planar electrodes were 73.0 mm long by 25.4 mm wide. The surface area of the electrode was calculated by multiplying the length of the electrode by the width of the electrode (e.g. 7.30 cm×2.54 cm=18.54 cm2). The de-chlorinated water was prepared by passing tap water through a PuR faucet mount filter (carbon block filter) and removing the chlorine from the water. The electric conductivity of the tap water used is 150 uS/cm. The amount of chloride ions measured in the tap water was 78 ppm. Ten liters of de-chlorinated water was collected. A peristaltic pump metered the solution from the glass container through the electrolysis cell at a flow rate of 300 ml/minute. A voltage potential of 4.5 volts was provided across the electrolysis cell at a current of 0.43 amps via a power supply (Tenma Laboratory, Model 72-630A). The resulting power was calculated by multiplying the voltage by the current (e.g. 4.5 V×0.44 A=1.98 W). The effluent solution was withdrawn from the electrolysis cell and analyzed. The effluent contained a total of 2.90 ppm concentration of mixed oxidants as measured via the DPD Hach method for free chlorine. The productivity index achieved was 439 as measured by the efficiency calculation described in equation I ($\eta=(CMO*Q)/(I*V)$). Various other test conditions are listed in table A.

TABLE A

| Electrode Spacing (mm) | Flow Rate (ml/min) | Voltage (V) | Current (A) | Power (W) | Electrode Surface Area (cm2) | Oxidant Conc'n (ppm) | Productivity Index |
|---|---|---|---|---|---|---|---|
| 0.46 | 100 | 4.5 | 0.65 | 2.93 | 18.5 | 12.56 | 429 |
| 0.46 | 500 | 4.5 | 0.44 | 1.98 | 18.5 | 1.42 | 359 |
| 0.46 | 1000 | 4.5 | 0.40 | 1.80 | 18.5 | 0.54 | 300 |
| 0.46 | 100 | 6.0 | 1.14 | 6.84 | 18.5 | 20.90 | 306 |
| 0.46 | 500 | 6.0 | 0.87 | 5.22 | 18.5 | 3.03 | 290 |
| 0.46 | 1000 | 6.0 | 0.73 | 4.38 | 18.5 | 1.13 | 258 |
| 0.23 | 100 | 4.5 | 0.32 | 1.44 | 9.0 | 4.60 | 319 |
| 0.23 | 500 | 4.5 | 0.23 | 1.04 | 9.0 | 0.72 | 346 |
| 0.23 | 1000 | 4.5 | 0.22 | 0.99 | 9.0 | 0.33 | 333 |
| 0.23 | 100 | 6.0 | 0.67 | 4.02 | 9.0 | 7.88 | 196 |
| 0.23 | 500 | 6.0 | 0.45 | 2.70 | 9.0 | 1.20 | 222 |
| 0.23 | 1000 | 6.0 | 0.41 | 2.46 | 9.0 | 0.59 | 240 |
| 0.46 | 100 | 4.5 | 0.25 | 1.13 | 9.0 | 3.53 | 312 |
| 0.46 | 500 | 4.5 | 0.20 | 0.90 | 9.0 | 0.44 | 244 |
| 0.46 | 1000 | 4.5 | 0.18 | 0.81 | 9.0 | 0.12 | 148 |
| 0.46 | 100 | 6.0 | 0.42 | 2.52 | 9.0 | 6.18 | 245 |
| 0.46 | 500 | 6.0 | 0.30 | 2.34 | 9.0 | 0.83 | 177 |
| 0.46 | 1000 | 6.0 | 0.35 | 2.10 | 9.0 | 0.26 | 124 |
| 0.23 | 100 | 4.5 | 0.19 | 0.86 | 4.5 | 2.08 | 242 |
| 0.23 | 500 | 4.5 | 0.13 | 0.59 | 4.5 | 0.23 | 195 |
| 0.23 | 1000 | 4.5 | 0.12 | 0.54 | 4.5 | 0.05 | 93 |
| 0.23 | 100 | 6.0 | 0.41 | 2.46 | 4.5 | 3.80 | 154 |
| 0.23 | 500 | 6.0 | 0.25 | 1.50 | 4.5 | 0.44 | 147 |
| 0.23 | 1000 | 6.0 | 0.22 | 1.32 | 4.5 | 0.14 | 106 |

TABLE A-continued

| Electrode Spacing (mm) | Flow Rate (ml/min) | Voltage (V) | Current (A) | Power (W) | Electrode Surface Area (cm2) | Oxidant Conc'n (ppm) | Productivity Index |
|---|---|---|---|---|---|---|---|
| 0.46 | 100 | 4.5 | 0.07 | 0.32 | 4.5 | 0.99 | 309 |
| 0.46 | 500 | 4.5 | 0.06 | 0.27 | 4.5 | 0.13 | 241 |
| 0.46 | 1000 | 4.5 | 0.06 | 0.27 | 4.5 | 0.04 | 148 |
| 0.46 | 100 | 6.0 | 0.14 | 0.84 | 4.5 | 1.80 | 214 |
| 0.46 | 500 | 6.0 | 0.11 | 0.66 | 4.5 | 0.28 | 212 |
| 0.46 | 1000 | 6.0 | 0.11 | 0.66 | 4.5 | 0.10 | 152 |

Example 2

Flow Cell and Water with Salt Added

The electrolysis cell of Example 1 was operated using an aqueous feed solution consisting of a prepared salt solution. Sodium chloride salt was added to de-ionized water. For this test, 500 mg of technical grade sodium chloride (Aldrich Chemical Company, Inc, Milwaukee, Wis. 53233) was added and mixed with a stirring bar until dissolved, forming a 50 ppm chloride from a sodium chloride salt solution. The aqueous feed solution was retained in a 10-liter glass container. A peristaltic pump metered the solution from the glass container through the electrolysis cell at a flow rate of 300 ml/minute. A voltage potential of 4.5 volts was provided across the electrolysis cell at a current of 0.22 amps. The effluent solution was withdrawn from the electrolysis cell and analyzed. The effluent contained 2.13 ppm oxidants. The calculated productivity index was 645.

Example 3

Flow Cell with AA Batteries

The electrolysis cell of Example 1 was operated in a similar way as described in example 1 but the power supply was replaced with 3 AA batteries (Duracell). A peristaltic pump metered the de-chlorinated water from the glass container through the electrolysis cell at a flow rate of 300 ml/minute. From the 3 AA batteries, a voltage potential of 4.1 volts was provided across the electrolysis cell and a current of 0.34 amps was measured. The effluent solution was withdrawn from the electrolysis cell and analyzed. The effluent contained 1.96 ppm oxidant. The calculated productivity index was 427.

Example 4

Re-Circulating Cell with Naturally Present Salt in Water

The electrolysis cell of FIG. 10 was operated under the same operating conditions as that listed in example 1. The free oxidant concentration of the 10 liter of water increases over time. Results are shown in Table B below.

TABLE B

| Electrode Spacing (mm) | Time (min) | Voltage (V) | Current (A) | Power (W) | Electrode Surface Area (cm2) | Oxidant Conc'n (ppm) |
|---|---|---|---|---|---|---|
| 0.46 | 0 | 0 | 0 | 0 | 18.5 | 0 |
| 0.46 | 1 | 4.5 | 0.43 | 1.94 | 18.5 | 0.06 |
| 0.46 | 3 | 4.5 | 0.45 | 2.03 | 18.5 | 0.23 |
| 0.46 | 5 | 4.5 | 0.44 | 1.98 | 18.5 | 0.41 |
| 0.46 | 10 | 4.5 | 0.45 | 2.03 | 18.5 | 0.83 |
| 0.46 | 20 | 4.5 | 0.45 | 2.03 | 18.5 | 1.55 |
| 0.46 | 30 | 4.5 | 0.45 | 2.03 | 18.5 | 2.31 |

The present invention may be appreciated in a multitude of applications including, but not limited to, faucet-mounted filters, counter-top water purification devices, under-sink water purification devices, camping/backpack water purification devices, travel water purification devices, refrigerator water purification devices, pitcher-type gravity flow water purification devices, bathing water purification devices, and spa-type water purification devices.

The various advantages of the present invention will become apparent to those skilled in the art after a study of the foregoing specification and following claims.

What is claimed is:

1. An apparatus for electrolyzing an electrolytic solution, said apparatus comprising:
    (a) at least one non-barrier electrolytic cell further comprising:
        (i.) a porous anode;
        (ii.) a cathode, said porous anode and said cathode defining a cell chamber having a cell gap that separates said anode and said cathode by about 0.6 mm or less;
        (iii.) an inlet port in fluid communication with said cell chamber, wherein said inlet port provides an entry for and guides a flow of electrolytic solution directly into the cell chamber;
        (iv.) an outlet port in fluid communication with said cell chamber, said outlet port configured to provide an exit for said electrolytic solution from the cell chamber;
        (v.) a direct current power supply providing an electrical current between said anode and said cathode, whereby said electrical current electrolyzes said electrolytic solution between said anode and said cathode and within said porous anode; and
        (vi.) a porous flow barrier disposed within said cell chamber.

2. The apparatus according to claim 1 wherein said apparatus further comprises a body, said body providing containment for said electrolytic cell and said current supply, wherein said apparatus yields a Productivity Index of at least 300.

3. The apparatus according to claim 1 wherein said apparatus further comprises a fluid movement mechanism for moving said electrolytic solution into said inlet port and out of said outlet port.

4. The apparatus according to claim 3 wherein said fluid movement mechanism recirculates said electrolytic solution that has exited said outlet port back into said inlet port in order to repeat said electrolyzing of said electrolytic solution.

5. The apparatus according to claim 1 wherein said apparatus further comprises a filter for removal of impurities from said electrolytic solution.

6. The apparatus according to claim 5 wherein said filter is positioned before said electrolytic cell.

7. The apparatus according to claim 5 wherein said filter is positioned after said electrolytic cell.

8. The apparatus according to claim 5 wherein said filter has a size to remove 99.95% of particulates having a size of at least 3 microns or greater from said electrolytic solution.

9. The apparatus according to claim 5 wherein said filter is structured to remove organic species from said electrolytic solution.

10. The apparatus according to claim 9 wherein said filter is positioned after said electrolytic cell and said electrolytic cell converts said organic species to a form that is removable by said filter.

11. The apparatus according to claim 5 wherein said filter is structured to remove inorganic species from said electrolytic solution.

12. The apparatus according to claim 11 wherein said filter is positioned after said electrolytic cell and said electrolytic cell converts an oxidation state of said inorganic species to a state that is removable by said filter.

13. The apparatus according to claim 11 wherein said filter is positioned after said electrolytic cell.

14. The apparatus according to claim 5 wherein said filter is constructed in part or in total of a resin.

15. The apparatus according to claim 5 wherein said filter is constructed in part or in total of carbon.

16. The apparatus according to claim 1 wherein said apparatus further comprises an ion exchange resin usable as a pre-treatment to said electrolytic solution prior to said electrolyzing of said electrolytic solution.

17. The apparatus according to claim 16 wherein said ion exchange resin increases a halogen-containing ion concentration of said electrolytic solution upon contact therewith.

18. The apparatus according to claim 16 wherein said ion exchange resin decreases a concentration of scale-forming ions from said electrolytic solution upon contact therewith.

19. The apparatus according to claim 16 wherein said ion exchange resin is a water softener.

20. The apparatus according to claim 1 wherein said apparatus further comprises a water-presence sensor capable of triggering a start of said electrolyzing of said electrolytic solution in the presence of electrolytic solution and also capable of triggering a stop of said electrolyzing of said electrolytic solution the absence of electrolytic solution.

21. The apparatus according to claim 20 wherein said water-presence sensor comprises a field effect transistor.

22. The apparatus according to claim 1 wherein said current supply is selected from a group consisting of battery, ac-dc converter, solar cell, manual crank generator system, water pressure/turbine energy system and combinations thereof.

23. The apparatus according to claim 1 wherein said porous anode comprises a Group VIII metal.

24. The apparatus according to claim 1 wherein said porous flow barrier is constructed of a material selected from the group consisting of polyethylene, polypropylene, polyolefin, glass and silicon.

25. The apparatus according to claim 1 wherein said porous anode is a porous metallic anode.

26. The apparatus according to claim 1 wherein said apparatus is structured as a device selected from the group consisting of: faucet-mounted filters, counter-top water purification devices, under-sink water purification devices, camping/backpack water purification devices, travel water purification devices, refrigerator water purification devices, pitcher-type gravity flow water purification devices, bathing water purification devices, and spa-type water purification devices.

27. The apparatus according to claim 1 wherein said apparatus kills microorganisms upon electrolyzing said electrolytic solution.

28. An apparatus for electrolyzing natural water, said apparatus comprising:
at least one non-membrane electrolytic cell further comprising:
(a) a porous anode;
(b) a cathode, said porous anode and said cathode defining a cell chamber having a cell gap that separates said anode and said cathode by about 0.6 mm or less;
(c) an inlet port in fluid communication with said cell chamber, wherein said inlet port provides an entry for and guides a flow of un-electrolyzed natural waters directly into the cell chamber;
(d) an outlet port in fluid communication with said cell chamber, said outlet port configured to provide an exit for electrolyzed natural water from the cell chamber;
(e) a current power supply for providing an electrical current between said anode and said cathode, whereby the electrical current electrolyzes said flow of un-electrolyzed natural waters between said anode and said cathode; and
(f) a porous flow barrier disposed within said cell chamber.

29. The apparatus according to claim 28 wherein a filter is positioned after said electrolytic cell and said electrolytic cell converts oxidation states of inorganic species to states that are removable by the filter.

30. An apparatus for electrolyzing an electrolytic solution, said apparatus comprising:
at least one non-barrier electrolytic cell further comprising:
(a) a cell chamber, said cell chamber having a first interior surface opposite a second interior surface and a third interior surface opposite a fourth interior surface, said cell chamber defining a cell gap;
(b) a porous anode, said porous anode forming the first interior surface of the cell chamber;
(c) a cathode, said cathode forming the second interior surface of the cell chamber, said cell gap separating said anode and cathode by about 0.6 mm or less;
(d) an inlet port in fluid communication with said cell chamber, wherein said inlet port provides an entry for and guides a flow of electrolytic solution directly into the cell chamber;
(e) an outlet port in fluid communication with said cell chamber, said outlet port configured to provide an exit for said electrolytic solution from the cell chamber;
(f) a direct current power supply providing an electrical current between said anode and said cathode, whereby said electrical current electrolyzes said electrolytic solution between said anode and said cathode and within said porous anode; and
(g) a porous flow barrier disposed within said cell chamber.

* * * * *

UNITED STATES PATENT AND TRADEMARK OFFICE
CERTIFICATE OF CORRECTION

PATENT NO. : 8,333,873 B2
APPLICATION NO. : 11/903613
DATED : December 18, 2012
INVENTOR(S) : Mario Elmen Tremblay et al.

It is certified that error appears in the above-identified patent and that said Letters Patent is hereby corrected as shown below:

In the Claims:

Col. 17, Line 50, Claim 20, "the absence of" should read --in the absence of--.

Signed and Sealed this
Sixteenth Day of July, 2013

Teresa Stanek Rea
*Acting Director of the United States Patent and Trademark Office*